VARIABLE IMPEDANCE DEVICE
Filed Feb. 28, 1955
FIG. 1.
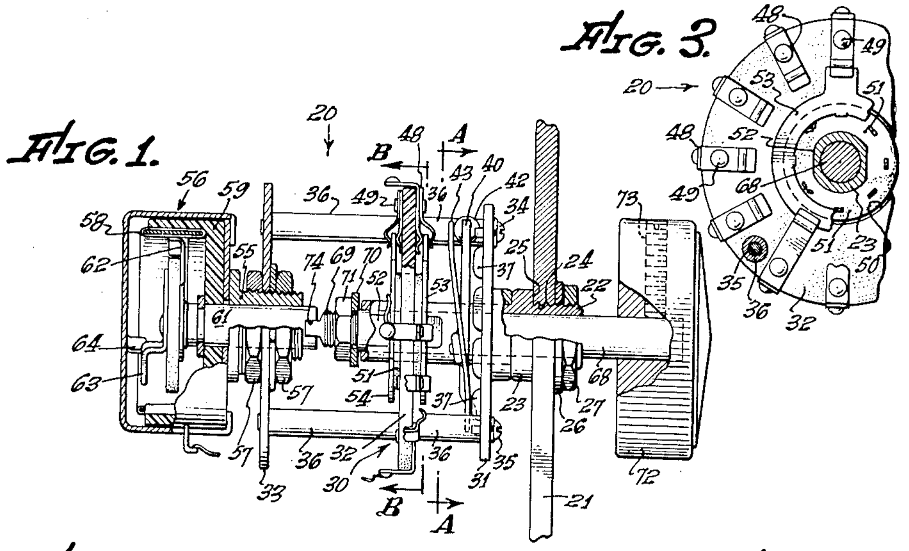
FIG. 1, FIG. 3
FIG. 2.
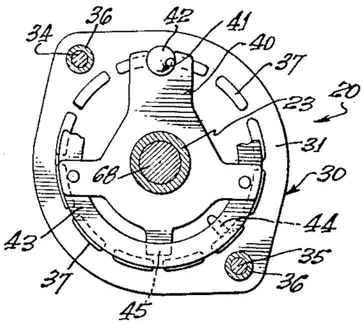
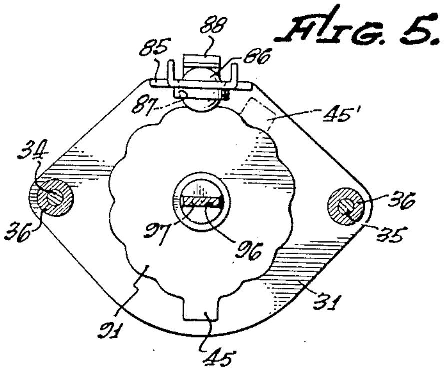
FIG. 5.
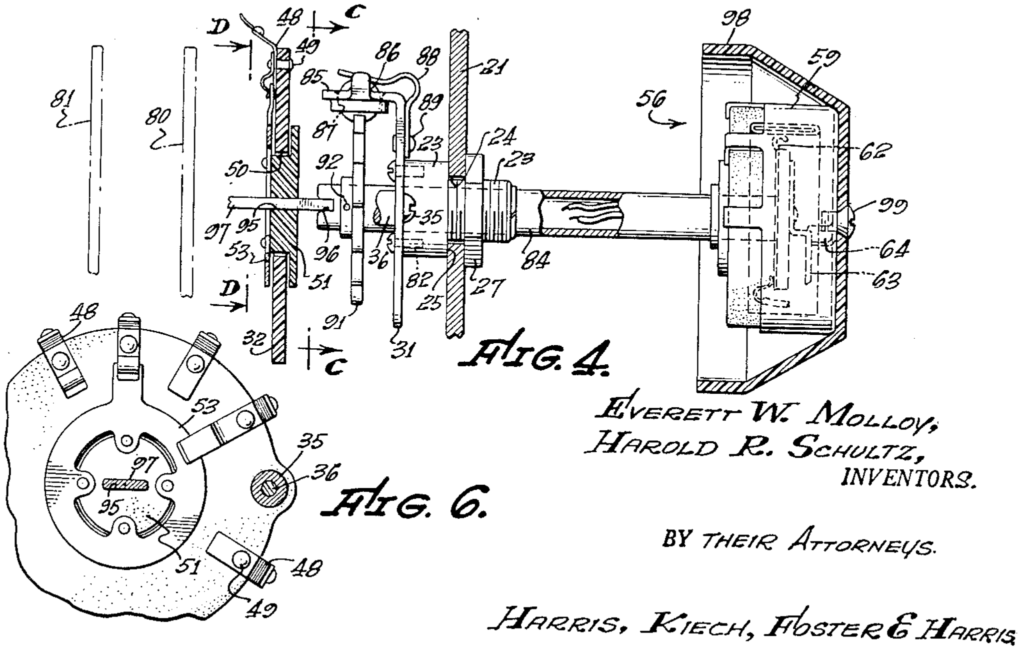
FIG. 4, FIG. 6
EVERETT W. MOLLOY,
HAROLD R. SCHULTZ,
INVENTORS.
BY THEIR ATTORNEYS.
HARRIS, KIECH, FOSTER & HARRIS

EVERETT W. MOLLOY,
HAROLD R. SCHULTZ,
INVENTORS

BY THEIR ATTORNEYS.

HARRIS, KIECH, FOSTER & HARRIS.

1

2,729,727

VARIABLE IMPEDANCE DEVICE

Everett W. Molloy, South San Gabriel, and Harold R. Schultz, Anaheim, Calif., assignors to Beckman Instruments, Inc., Fullerton, Calif., a corporation of California Application February 28, 1955, Serial No. 490,971
19 Claims. (Cl. 201—48)

This invention relates to impedance devices and especially to a variable impedance device providing a fine control which can be quickly shifted from one portion of the impedance to another.

Variable impedance devices like the conventional single-turn potentiometer suffer from the disadvantage that the resolution of the device is limited by the requirement that the entire impedance range must be traversed in one revolution or less of the control shaft. The multi-turn helical potentiometer permits an increased resolution allowing the total impedance to be traversed in a plurality of revolutions of the control shaft. However, in the multi-turn instrument, the entire range must be traversed when moving the control point from one end of the impedance to the other. This is a relatively time consuming and laborious operation.

It is an object of the invention to provide a variable impedance device having a fine control over a selected small portion of the total impedance which can be quickly shifted to another small portion of the total impedance.

Another object of the invention is to provide a variable impedance device which is adaptable to either linear or rotary control motion and one which is adaptable for varying resistive, inductive or capacitive impedance.

A further object of the invention is to provide a variable impedance device requiring only a single control knob or actuator and one which may be mounted on an instrument panel or the like.

It is a further object of the invention to provide a rotary type variable impedance device in which the total impedance can be traversed in less than two revolutions of the control knob and in which a selected portion of the total impedance can be traversed in nearly one revolution of the control knob.

A particular object of the invention is to provide a circuit for a variable impedance device in which a continuously variable impedance element is connected across various portions of a stepwise variable impedance element to provide an output continuously variable over the entire range of the stepwise variable impedance element.

The variable impedance device of the invention includes an actuating means which is energized from an external source, such as manually, the actuating means driving a continuously variable impedance element over a given range. The ends of the range include limit stops which engage the actuating means. The moving portion of a main impedance element or switch is coupled to the continuously variable impedance element and when the actuating means engages a limit stop and is then urged further in the same direction, the entire continuously variable element and the moving portion of the main element will move with the actuating means, electrically shifting the continuously variable element to a new position on the main element.

The invention also comprises novel details of construction and novel combinations and arrangements of parts, which will more fully appear in the course of the following description. The drawings and description merely show and describe preferred embodiments of the invention as applied to a rotating variable resistance device, which is given by way of illustration or example

2 only. However, it will be clear to those skilled in the art that the invention is equally applicable to inductance and capacitance devices and to translating as well as rotating devices.

In the drawings:

Fig. 1 is a side elevation view of an embodiment of the invention shown partly in section;

Fig. 2 is a sectional view taken along the line A—A of Fig. 1;

Fig. 3 is a partial sectional view taken along the line B—B of Fig. 1;

Fig. 4 is a partial side elevation view of another embodiment of the invention shown partly in section;

Fig. 5 is a sectional view taken along the line C—C of Fig. 4;

Fig. 6 is a partial sectional view taken along the line D—D of Fig. 4;

Figure 15:
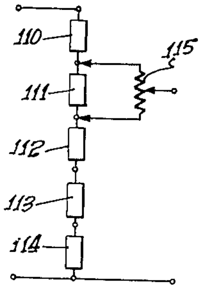
Figs. 15 through 18 are schematic diagrams of electrical connections utilized in the invention.

In Fig. 1, a variable impedance device 20 is shown inserted in a panel 21. A threaded portion 22 of a support sleeve 23 extends through an opening 24 in the panel 21, a shoulder 25 of the sleeve 23 resting against the panel. The sleeve 23 is held in position by a lockwasher 26 and a nut 27 tightened over the threaded portion 22.

A frame 30 of a conventional wafer switch assembly is rotatably positioned on the sleeve 23. The frame 30 includes a front plate 31, a contact carrier plate 32 and a back plate 33 which are connected together by screws 34, 35 and tubular spacers 36.

A spring and ball detent arrangement provides for stepwise rotation of the frame 30 with respect to the sleeve 23. A plurality of lugs 37 extend from one surface of the front plate 31 and a ball carrier plate 40 is rigidly attached to the sleeve 23, the plate 40 having a notch 41 therein positioned to overlie successive lugs 37. A ball 42 is located in the notch 41, the ball being retained in place between the lugs 37 and a detent spring 43. A stop boss 44 is mounted on the front plate 31 and engages a tongue 45 on the ball carrier plate 40, thereby limiting the relative rotation of the frame 30 and the sleeve 23.

The contact carrier plate 32 is made of a suitable insulating material and a plurality of electrical contacts 48 are mounted around the periphery of the plate and on both sides thereof by suitable means such as rivets 49. An opening 50 is provided in the center of the plate 32 and a rotor 51, also made of electrical insulating material, is rotatably positioned within the opening 50, the rotor 51 being mounted on flattened portions 52 of the sleeve 23. Two contact arms 53, 54 of electrical conducting material are mounted on the rotor 51, the contact arms electrically interconnecting various of the contacts 48, depending upon the relative position of the frame 30 and the sleeve 23. When this embodiment of the invention is utilized in the matter to be described subsequently, the leads of various resistors will be connected to the contacts 48 in a manner determined by the particular electrical circuit being followed.

A support bushing 55 of a potentiometer 56 is connected to the back plate 33 in a conventional manner, as by locknuts 57, the axes of the bushing 55 and the sleeve 23 being in line. The potentiometer 56 includes a resistance element 58 mounted in a case 59 and a shaft 61 rotatably positioned within the bushing 55, this shaft carrying a wiper arm 62 which contacts the resistance element 58. An arm 63 is mounted on the shaft 61 and is positioned to engage a lug 64 extending from the case 59 upon rotation of the shaft 61 relative to the case. The engagement of the arm 63 with the lug 64 limits the travel of the wiper arm 62 along the resistance element 58, the amount of travel permitted being controlled by the width of the arm and lug.

A shaft 68 is rotatably positioned within the sleeve 23, the shaft 68 extending from both ends of the sleeve. A threaded portion 69 is provided on one end of the shaft 68, this shaft being maintained in position by a washer 70 and a nut 71 mounted on the threaded portion 69. A knob 72 is mounted on the opposite end of the shaft 68 by suitable means, such as a setscrew 73. A groove 74 is provided in the end of the shaft 61 and a mating tongue of the shaft 68 engages the groove 74, thereby transmitting rotary motion from the shaft 68 to the shaft 61.

The knob 72 may be rotated over a range limited by the engagement of the arm 63 and the lug 64 to traverse the wiper arm 62 along the resistance element 58. When the wiper 62 is at the end of the range, the arm and lug being engaged, further rotation of the knob 72 causes the shaft 61 and the case 59 of the potentiometer 56 to rotate in unison without varying the relative position of the wiper 62 on the resistance element 58. Since the case 59 of the potentiometer 56 is rigidly connected to the frame 30 of the wafer switch assembly, the frame 30 will also be rotated by the rotation of the knob 72. The relative rotation of the wiper 62 and the resistance element 58 is limited to less than one revolution by the arm 63 and the stop 64, and, similarly, the relative rotation of the contact plate 32 and the contact arms 53, 54 is limited to less than one revolution by the engagement of the lug 44 and the tongue 45. Therefore, the variable impedance device of the invention may be moved from any position to any other possible position with less than two revolutions of the shaft 68.

A second embodiment of the invention similar to that of Fig. 1 is shown in Fig. 4, like numerals in the figures indicating like parts. The embodiment of Fig. 4 differs from that of Fig. 1 in that the physical arrangement of the components varies and in that the relative movements of the components vary; however, the method of operation of the two embodiments is the same. The frame of the wafer switch assembly, corresponding to the frame 30 of the Fig. 1, is not completely illustrated in Fig. 4, only the front plate 31 and the contact plate 32 being shown. Additional contact plates 80 and 81 similar to the contact plate 32 are shown in phantom. In the embodiment of Fig. 1, the front plate 31 was rotatably mounted on the sleeve 23. In contrast, the front plate 31 of Fig. 4 is rigidly mounted to the sleeve 23 by screws 82, thereby maintaining the contact plate 32 fixed with respect to the panel 21.

A shaft 84 is rotatably positioned within the sleeve 23, the shaft extending from both ends of the sleeve. A spring and ball detent arrangement couples the shaft 84 to the front plate 31, thereby providing for stepwise rotation of the shaft with respect to the sleeve 23. A portion 85 of the front plate 31 extends at right angles to the plate and parallel to the shaft 84, a ball 86 being positioned in a tapered opening 87 in the portion 85. A leaf spring 88 is attached to the front plate 31 by a rivet 89 and serves to retain the ball 86 in the tapered opening 87, urging the ball towards the shaft 84. A detent plate 91 having a notched periphery is rigidly mounted on the shaft 84 by a pin 92, the ball 86 riding on the edge of the detent plate 91. The tongue 45 extends from the edge of the detent plate 91 and engages the ball 86 and the portion 85, thereby limiting the relative rotation of the shaft with respect to the sleeve 23.

A rectangular slot 95 is provided in the rotor 51 and a corresponding groove 96 is provided in the end of the shaft 84 adjacent the rotor 51. A rectangular cross section drive plate 97 is positioned in the groove 96 and extends through the opening 95, coupling the shaft 84 to the rotor 51 so that the stepwise rotary motion of the shaft 84 is transmitted to the rotor 51, thereby changing the relative position of the contact arm 53 and the contacts 48.

The potentiometer 56 is positioned at the end of the shaft 84 opposite the contact plate 32, the wiper 62 and arm 63 of the potentiometer being mounted on the shaft 84. The case 59 of the potentiometer containing the resistance element 58 is relatively rotatable with respect to the shaft 84 in the conventional manner so that rotary movement of the case 59 will cause the wiper 62 to traverse the resistance element 58 throughout the range permitted by the arm 63 and lug 44. A knob 98 is mounted over the potentiometer 56 by a screw 99 providing a convenient grip for manual rotation of the potentiometer case 59. The shaft 84 may be made hollow to contain the electrical conductors running from the potentiometer to the wafer switch side of the panel 21.

In the embodiment of the invention illustrated in Fig. 4, rotation of the knob 98 causes the resistance element 58 to move relative to the wiper 62 as the wiper traverses the range of the resistance element permitted by the arm 63 and lug 64. When the arm and lug are engaged, further rotation of the knob 98 produces a corresponding rotation of the shaft 84 and of the rotor 51 relative to the sleeve 23. This is in contrast to the embodiment of Fig. 1 wherein the contact plate 32 rather than the rotor 51 moved relative to the support sleeve 23.

Figures 7, 8, 9, 10:
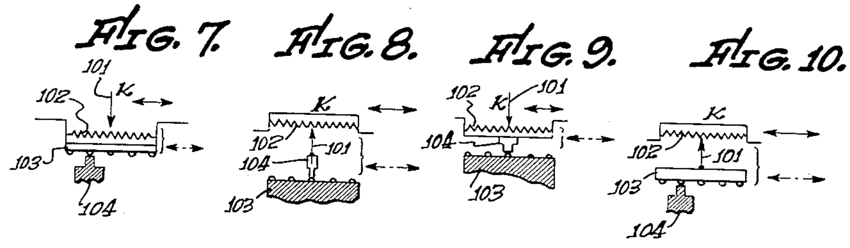
Figs. 7 through 14 are diagrammatic representations of possible configurations of the invention.

The particular mechanical arrangement of the resistance element, the wiper arm, the contact plate and the contact rotor is not critical in the practice of the invention. Two possible arrangements have been discussed above and these two arrangements, together with others, are shown diagrammatically in Figs. 7 through 14. Therein the element directly driven by the knob is indicated by the letter K and by the solid horizontal arrow, the elements driven stepwise by the knob when the limit stops are engaged are indicated by the brace and by the dotted horizontal arrow, and the element which is fixed relative to the panel and the support sleeve is indicated by hatching. Fig. 7 is a diagrammatic representation of the embodiment of Fig. 1, the vertical arrow 101 representing the potentiometer wiper 62, the zigzag line 102 representing the resistance element 58, the line 103 with the semicircles thereon representing the contact plate 32, and the hatched area 104 representing the arm 53. Fig. 8 corresponds to the embodiment of Fig. 4, wherein the resistance element is directly driven by the knob and the contact plate is fixed relative to the front panel. In Fig. 9, the wiper is directly driven by the knob and the contact plate is fixed relative to the panel, whereas in Fig. 10 the resistance element is directly driven by the knob and the contact arm is fixed relative to the panel.

Figures 11, 12, 13, 14:
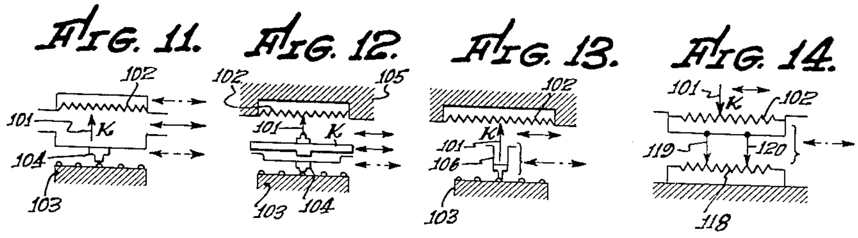

In Fig. 11, a variation of the mechanical arrangement of the elements is shown wherein the knob directly drives the wiper and the limit stops are located on the rotating contact arm of the wafer switch assembly, the stepwise rotating parts consisting of the case of the potentiometer and the wafer switch assembly being mechanically separate. In the embodiment illustrated in Fig. 12, both the resistance element 102 and the contact plate 103 are fixed relative to the panel, the knob K driving the wiper 101 through a friction clutch 105 so that when the knob K engages the limit stops associated with the contact arm 104, the contact arm may be rotated in unison with the knob K without moving the wiper 101 relative to the resistance element 102.

In the mechanical arrangement illustrated in Fig. 13, both the resistance element and the contact plate are fixed and the traversing range of the wiper is limited to a small portion of the resistance element by limit stops 106, the wiper traversing a different portion of the resistance element for each position of the contact arm relative to the contact plate.

Figure 16:
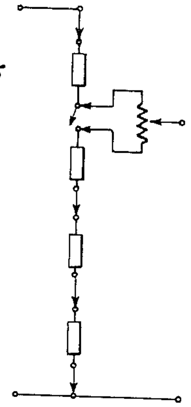
Figure 17:
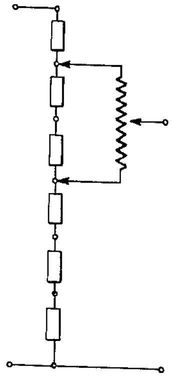

Electrical circuits in which the above described embodiments of the invention may be utilized are illustrated in Figs. 15 through 17. One way of obtaining fine control or high resolution in a voltage-dividing circuit is shown in Fig. 15, wherein fixed value resistors 110 through 114 are serially connected and a potentiometer 115 is connected across one of the serially connected resistors. The serially connected resistors would be mounted on the contact plate 32 of the invention, the junction points between the resistors corresponding to the contacts 48 on the contact plate. The ends of the potentiometer 115 are connected to the contact arms 53, 54, and the operation of the wafer switch assembly described previously switches the potentiometer from one to another of the serially connected resistors. One disadvantage of this circuit is the loading error introduced by the potentiometer 115; that is, the voltage drop across the resistor 111 is less when it is shunted by the potentiometer 115 than when it is not so shunted. As a result, there is a gap between the voltage range that can be covered by the wiper of the potentiometer when it is in the position shown and when it is shunted across an adjacent serially connected resistor. The magnitude of this gap in the adjustment range may be reduced but not eliminated by increasing the resistance value of the potentiometer 115 relative to that of fixed resistors 110 through 114. However, this is not a desirable approach to the problem because of the difficulties encountered with high resistance value potentiometers and the high impedance presented by the divider to associated equipment.

In the circuit of Fig. 16, the potentiometer is serially inserted between pairs of the fixed resistors, thus eliminating the gaps between the adjustment ranges. While this circuit eliminates the problem due to gaps without an increase in the resistance value of the potentiometer, a marked increase in the complexity of the switching mechanism is required.

The circuit of Fig. 17 provides for adjustment over the total applied voltage without gaps occurring between the individual adjustment ranges, without the switching complexity of the circuit of Fig. 16 and without the use of high resistance potentiometers. Therein, the potentiometer is switched in the same manner as in Fig. 15; however, the potentiometer is always shunted across two adjacent fixed value resistors. When the resistance of the potentiometer is equal to twice that of one of the fixed resistors, the fixed resistors being equal in value, the resistance of the parallel combination of the potentiometer and two fixed resistors is equal to the resistance of one of the fixed resistors. Under these conditions, the end of the adjustment range for a particular position of the potentiometer coincides with the beginning of the adjustment range when the potentiometer is switched to the adjacent pair of contacts. If it is desired to have the adjustment ranges overlap somewhat, the resistance of the potentiometer can be made more than twice that of one of the fixed resistors in this series chain, thereby making the resultant resistance of the parallel combination of potentiometer and two fixed resistors greater than the resistance of one of the fixed resistors.

Figure 18:
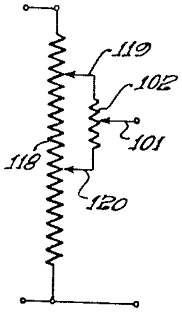

Each of the above embodiments of the invention has included a continuously variable impedance element as a fine control and a stepwise variable impedance element as a coarse control. However, the invention is also applicable to a variable impedance device in which both the fine and coarse controls are continuously variable. Such a device is shown diagrammatically in Fig. 14 wherein the wiper arm of the fine-control potentiometer is designated by the vertical arrow 101 and the resistance element thereof is designated by the zigzag line 102. The coarse control comprises a resistance element designated by the zigzag line 118 and two spaced wipers designated by the vertical arrows 119, 120, the spaced wipers 119, 120 being rigidly coupled to the case of the fine-control potentiometer. When the wiper 101 reaches the end of the range permitted by the limit stops associated with the fine-control potentiometer, further movement of the knob K will move the case of the fine-control potentiometer and the wipers of the coarse-control potentiometer, thereby connecting the fine-control potentiometer across a different portion of the coarse control potentiometer. A circuit diagram of this embodiment is given in Fig. 18, wherein corresponding elements have corresponding numbers.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a variable impedance device, the combination of: a first impedance element; stop means defining a range on said first impedance element; a first traversing element adjacent to said first impedance element and relatively movable with respect thereto within said range between said stop means to effectively vary the impedance thereof; actuating means coupled to one of said first elements for moving said one element relative to the other of said first elements to cause said first traversing element to traverse said first impedance element through said range; a second impedance element; a second traversing element adjacent to said second impedance element and relatively movable with respect thereto; and means for relatively moving said second impedance element and said second traversing element through a desired travel distance when said actuating means is urged beyond the points at which said first traversing element reaches the ends of said range.

2. A variable impedance device as defined in claim 1, in which said last-named means includes means operatively connecting said other of said first elements to one of said second elements to cause relative movement between said second elements when said actuating means is urged beyond said points.

3. In a variable impedance device, the combination of: first impedance-varying elements relatively movable over a range of relative movement to vary the impedance therebetween; stop means operative to determine an end of said range; actuating means coupled to one of said first elements for effecting said relative movement; means for mounting the other of said first elements to move with said actuating means when the latter is urged beyond the position at which said stop means becomes operative to determine said end of said range; second impedance-varying elements relatively movable to vary the impedance therebetween; and means for relatively moving said second elements in response to said movement of said other of said first elements induced by said movement of said actuating means beyond said position.

4. In a variable impedance device, the combination of: an impedance element; a traversing element adjacent to said impedance element and relatively movable within a range with respect thereto to effectively vary the impedance thereof; actuating means coupled to one of said elements for relatively moving said one element to cause said traversing element to traverse said impedance element through said range; means for maintaining the other of said elements stationary during said traversal; a switch comprising a switch arm and a contact assembly contactable by said arm; and means impelled by said actuating means, said means relatively moving said switch arm and said contact assembly through a desired switch travel distance when said actuating means is urged beyond the points at which said traversing element reaches the ends of said range.

5. In a variable impedance device, the combination of: an impedance element; a contact element electrically contacting said impedance element and positionable in a range between two points on said impedance element; actuating means for relatively moving one of said elements to cause said contact element to traverse said impedance element through said range; means for maintaining the other of said elements stationary during said traversal; a switch comprising a switch arm and a contact assembly contactable by said arm; and means impelled by said actuating means, said means relatively moving said switch arm and said contact assembly through a desired switch travel distance when said actuating means is urged beyond either of the positions at which said contact element reaches said points.

6. In a variable impedance device, the combination of: an impedance element; a traversing element positioned adjacent said impedance element and rotatable within a range relative thereto, the relative rotation of said element effectively varying the impedance of said impedance element; bearing means supporting said traversing element; actuating means coupled to one of said elements for relatively rotating said one element to cause said traversing element to traverse said impedance element through said range; switch means comprising an arm member and a contact member contactable by said arm member; and means impelled by said actuating means, said means relatively moving said arm member and said contact member through a desired switch travel distance when said actuating means is urged beyond the points at which said traversing element reaches the ends of said range.

7. A variable impedance device as defined in claim 6 in which said arm member and said contact member rotate relative to one another and in which said last mentioned means include means rotating said impedance element and said traversing element in unison with one of the members of said switch means as said one member rotates in response to said actuating means.

8. A variable impedance device as defined in claim 7 in which said relative rotation of said impedance element and said traversing element and of said arm member and said contact member is about the same axis.

9. In a variable impedance device, the combination of: a fine control comprising an impedance element continuously variable over a range; a coarse control comprising a stepwise variable impedance element capable of being stepped through a plurality of positions; actuating means coupled to said fine control, said actuating means varying said fine control over said range; and impelling means coupled to said coarse control, said impelling means being engaged in driving relationship by said actuating means when said actuating means is urged beyond the ends of said range, said impelling means stepping said coarse control to the next position when driven by said actuating means.

10. A variable impedance device as defined in claim 9 in which said actuating means and said impelling means are rotatable about the same axis.

11. A variable impedance device as defined in claim 9 in which said fine control includes a resistive potentiometer and in which said coarse control includes a plurality of fixed value resistors.

12. A variable impedance device as defined in claim 11 in which said plurality of resistors are serially connected and including circuit means connecting the ends of said potentiometer across pairs of said serially connected resistors as determined by the position of said coarse control.

13. A variable impedance device as defined in claim 12 in which each of said resistors has substantially the same resistance value and said potentiometer has a resistance value at least as great as twice the value of one of said resistors.

14. In a variable impedance device, the combination of: a switch comprising an arm and a contact assembly, said arm and said contact assembly being rotatably engageable; a potentiometer having a case and a wiper, said wiper being rotatable over a range with respect to said case, said case being mounted on said contact assembly to form an intermediate unit; and shaft means coupled to said wiper, said shaft means being coaxial with said switch, said shaft means engaging said intermediate unit when said wiper is rotated to the ends of said range and rotating said wiper and said intermediate unit in unison when said shaft means is rotated further.

15. In a variable impedance device, the combination of: a switch comprising an arm and a contact assembly, said arm and said contact assembly being rotatably engageable; a potentiometer having a case and a wiper, said wiper being rotatable over a range with respect to said case, said case being mounted on said arm to form an intermediate unit; and shaft means coupled to said wiper, said shaft means being coaxial with said switch, said shaft means engaging said intermediate unit when said wiper is rotated to the ends of said range and rotating said wiper and said intermediate unit in unison when said shaft means is rotated further.

16. In a variable impedance device, the combination of: a switch comprising an arm and a contact assembly, said arm and said contact assembly being rotatably engageable; a potentiometer having a case and a wiper, said wiper being rotatable over a range with respect to said case; and shaft means, said wiper and said arm being mounted on said shaft means, said case including actuating means engaging said shaft means when said case is rotated to the ends of said range and rotating said case and said shaft means in unison when said case is rotated further.

17. In a variable impedance device, the combination of: a switch comprising an arm and a contact assembly, said arm and said contact assembly being rotatably engageable; a potentiometer having a case and a wiper, said wiper being rotatable over a range with respect to said case; and shaft means, said wiper and said contact assembly being mounted on said shaft means, said case including actuating means engaging said shaft means when said case is rotated to the ends of said range and rotating said case and said shaft means in unison when said case is rotated further.

18. In a variable impedance device, the combination of: a shaft support sleeve adapted to be mounted in a panel; a shaft rotatably positioned within said sleeve and extending from opposing ends of said sleeve; knob means mounted on one end of said shaft; a potentiometer having a case and a rotor, said rotor being continuously rotatable with respect to said case between limits, said rotor being mounted on the other end of said shaft; a frame having a plurality of switch contacts, said case being mounted on said frame; a switch arm assembly mounted on said sleeve, said arm assembly being engageable with said contacts, said frame being stepwise rotatable with respect to said arm assembly; and detent means coupling said frame to said sleeve and holding said frame and said sleeve stationary while said rotor is being rotated between said limits.

19. In a variable impedance device, the combination of: a plurality of resistors, said resistors being substantially equal in value; circuit means connecting said plurality of resistors in series to form a single resistance element, said circuit means including a plurality of contacts, said contacts being located at each end of said resistance element and intermediate each pair of said resistors, forming a series of contacts; a potentiometer having a resistance at least twice that of one of said resistors, said potentiometer having a movable wiper arm and stop means limiting the travel of said wiper arm; and switch means connecting said potentiometer to the contacts at opposing ends of a connected pair of said resistors, forming a spaced pair of contacts, said switch means including means actuated by the engagement of said wiper arm and said stop means for switching said potentiometer to another spaced pair of contacts in said series.

References Cited in the file of this patent

UNITED STATES PATENTS

| | | |
|---|---|---|
| 2,662,145 | Wilentchik | Dec. 8, 1953 |
| 2,662,146 | Wilentchik | Dec. 8, 1953 |